United States Patent [19]

Holly

[11] 4,272,864
[45] Jun. 16, 1981

[54] METHOD FOR MAKING FOOD PATTY

[76] Inventor: Harry H. Holly, 150 Key Palm Rd., Boca Raton, Fla. 33432

[21] Appl. No.: 25,031

[22] Filed: Mar. 29, 1979

[51] Int. Cl.³ .............................................. A22C 7/00
[52] U.S. Cl. .......................................... 17/45; 17/32
[58] Field of Search ........................................... 17/32

[56] References Cited

U.S. PATENT DOCUMENTS

| 2,386,775 | 10/1945 | Balzarini | 17/32 X |
| 4,068,008 | 1/1978 | Orchard | 17/32 X |
| 4,148,598 | 4/1979 | Colosimo et al. | 17/32 X |

Primary Examiner—Willie G. Abercrombie
Attorney, Agent, or Firm—John P. Milnamow

[57] ABSTRACT

A method and apparatus are disclosed for forming a relatively porous patty of plastic food material that is subject to shrinkage during cooking. One embodiment of the apparatus includes a foraminous member having a plurality of apertures and a piston slidably disposed in a receiving chamber on one side of the foraminous member. A pressurizable feed chamber is provided with a feed mechanism for feeding and pressurizing the food material and forcing the material through the apertures and into the receiving chamber. A mold is provided for being aligned with the foraminous member and for receiving the material as it is discharged from the receiving chamber by movement of the piston. The discharging material impinges upon a wall of the mold to form a patty in which the material defines interstitial voids therein for entrapping air and providing retention of cooking juices to promote more rapid and uniform cooking of the patty.

15 Claims, 33 Drawing Figures

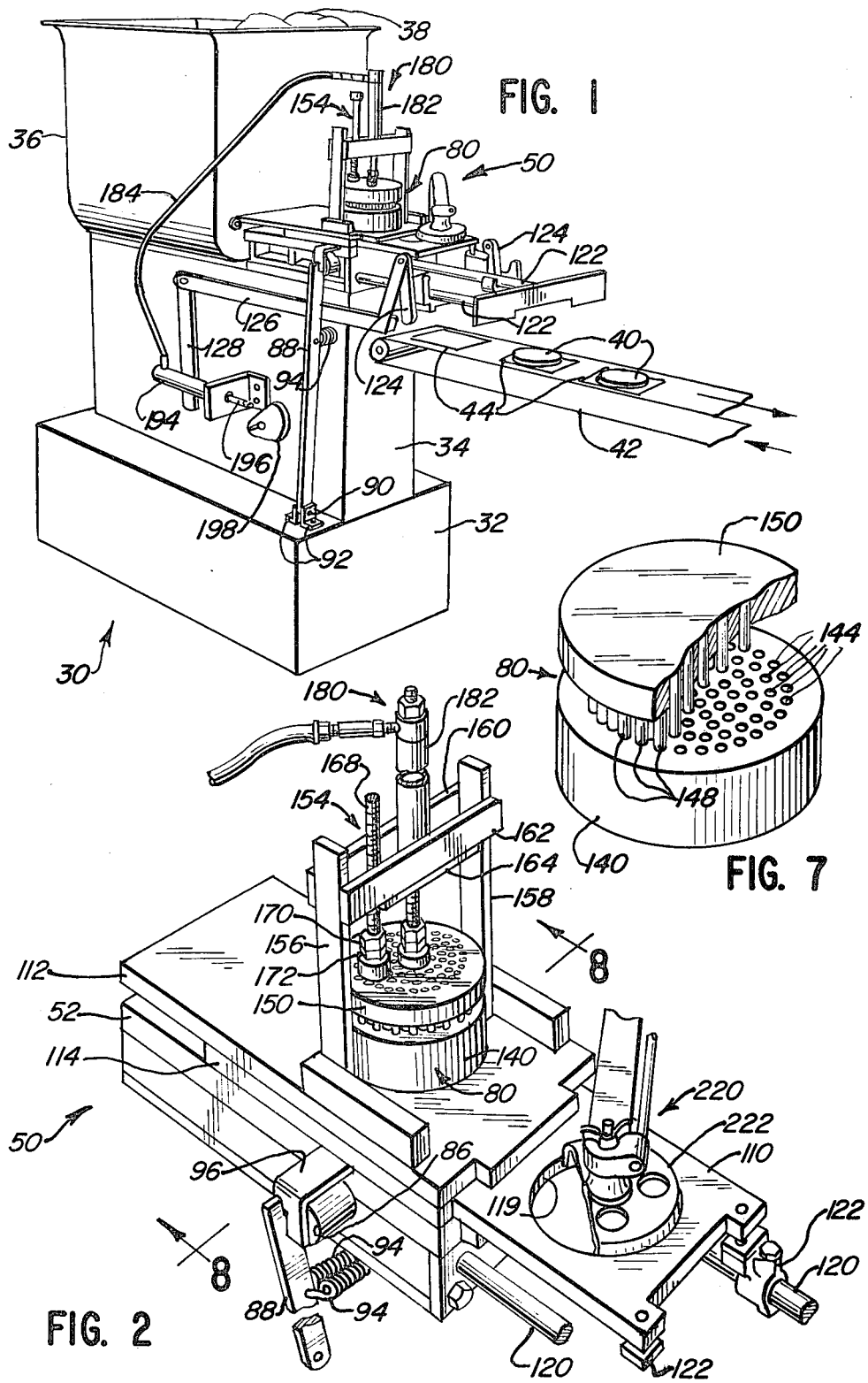

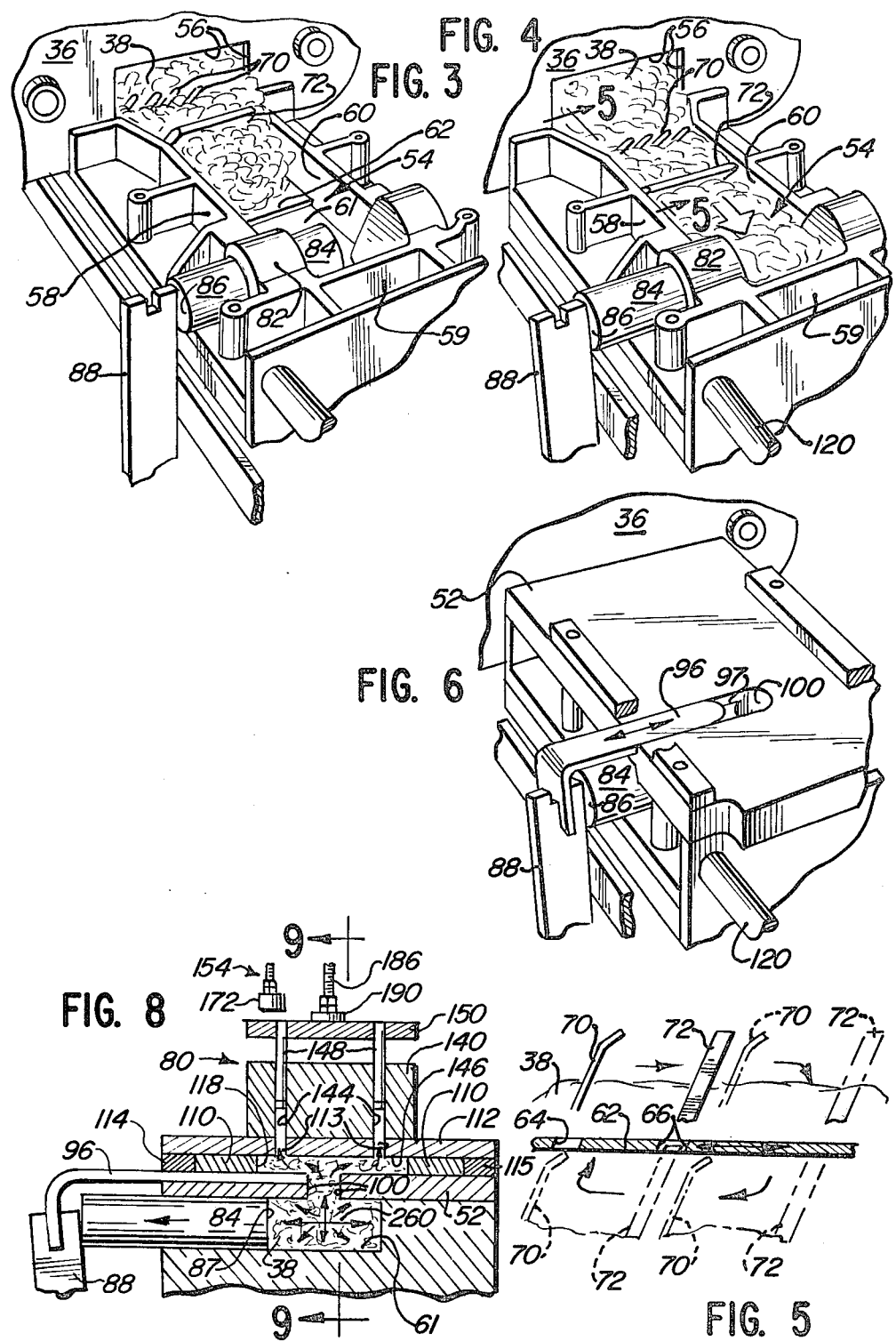

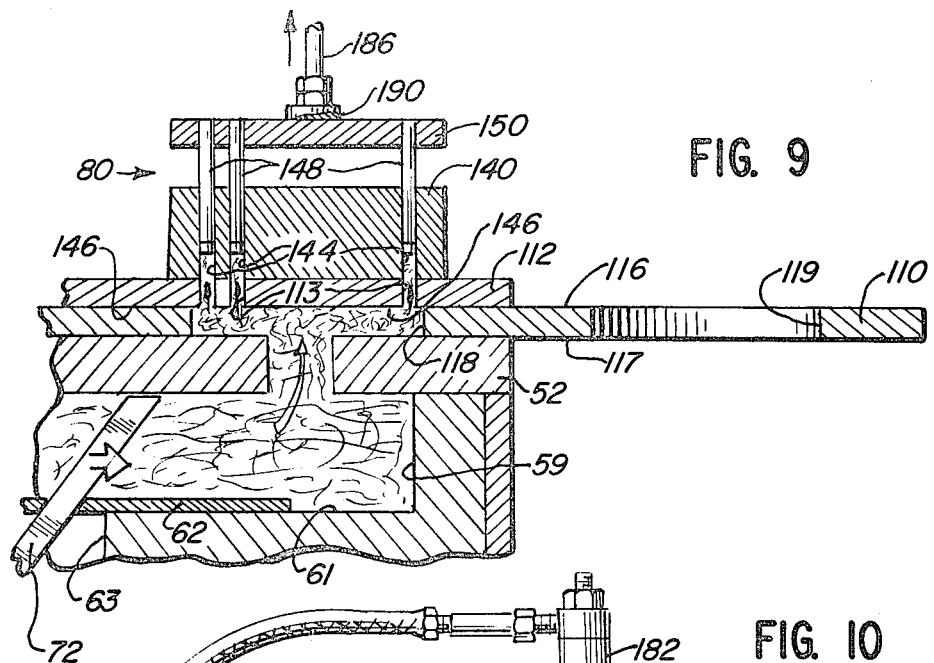
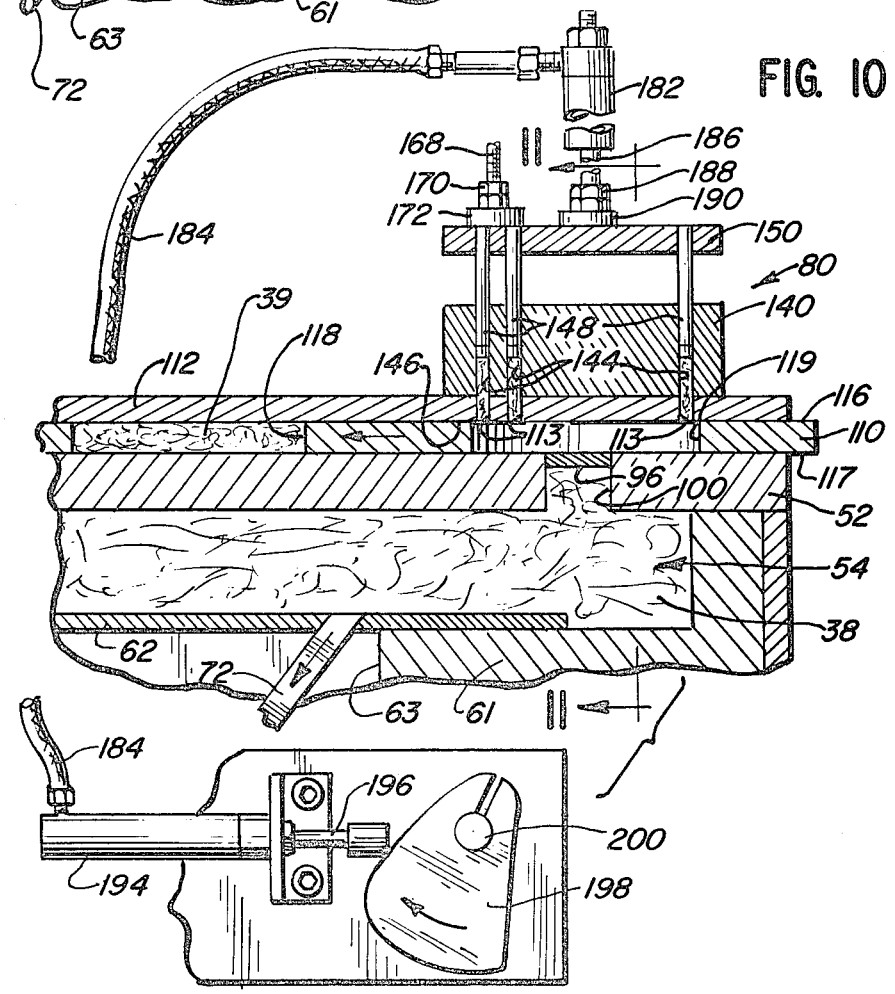

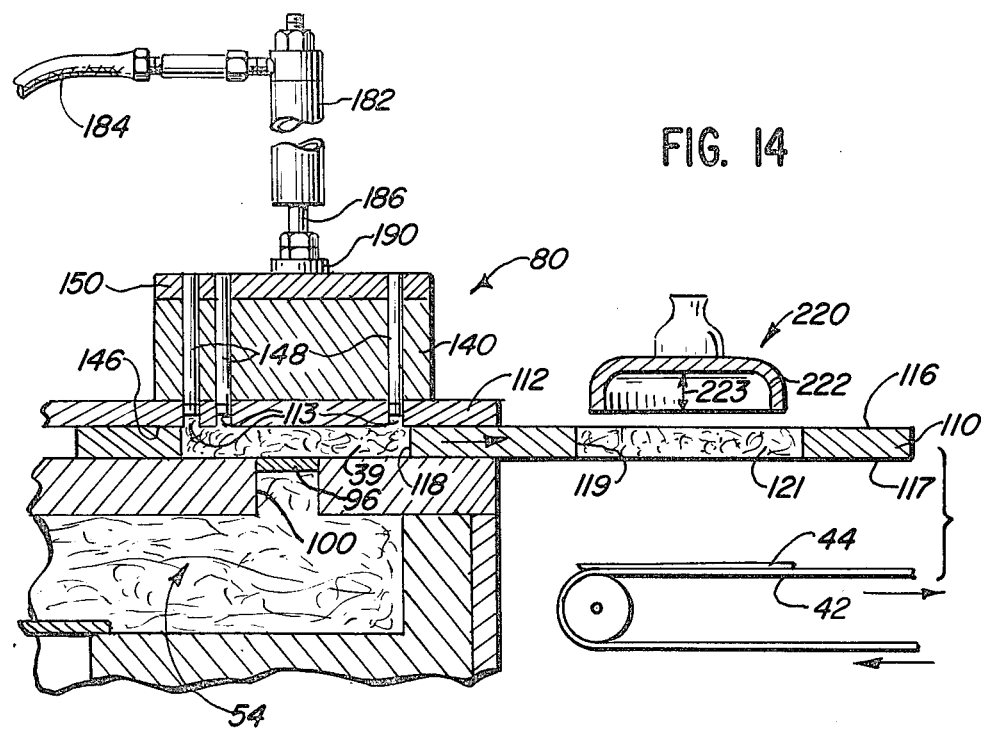
FIG. 14
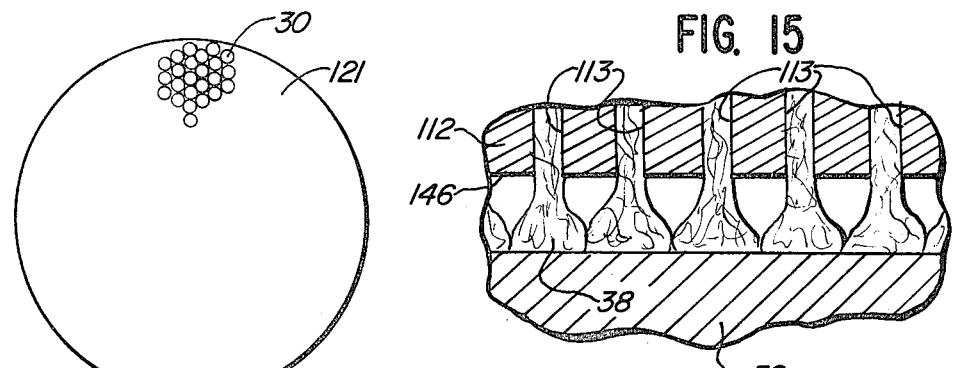
FIG. 15
FIG. 17
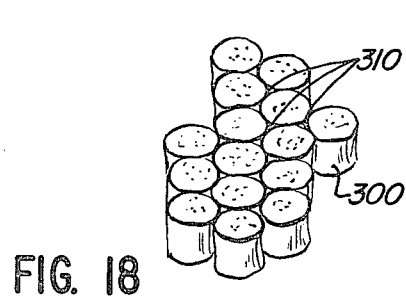
FIG. 18
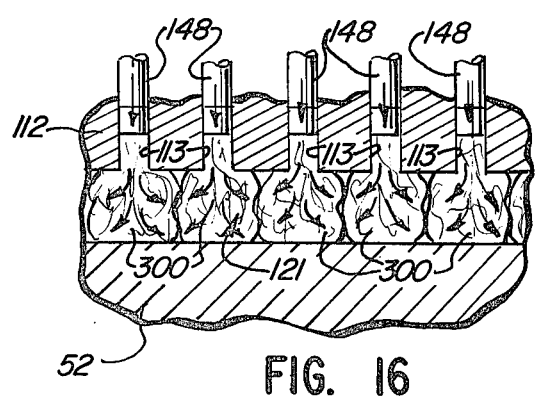
FIG. 16

METHOD FOR MAKING FOOD PATTY

DESCRIPTION

Technical Field

This invention relates to a type of patty made from plastic food material, such as ground meat and the like, to a method for making such a patty and to an apparatus for automatically making such a patty according to the method of the invention. The method and apparatus of the invention are suited particularly form making patties of ground beef, either alone or combined with desired additives.

Background Art

Patties of ground meat have been made for many years both by hand and automatically by machine. Typically, such prior art patties have a generally disc-like configuration. Since the ground beef patties are also usually always intended for later cooking, it is desirable that the patties have characteristics which permit them to be properly cooked to yield a cooked patty product having desirable appearance, texture, and taste characteristics.

With some types of prior art patties, the density within the patty varies across the patty. Then, during cooking of such a variable density patty, the meat within the patty is not uniformly cooked. Thus, it would be desirable to provide a patty having a generally uniform density to facilitate more uniform cooking.

Many prior art patties are made by various types of automatic patty-making apparatus which involve, at some stage in their operation, movement of a plate across one or more surfaces of the formed patty (or alternatively movement of the patty across a stationary surface). Frictional forces resulting from this movement tend to orient portions of the surface of the patty in directions along the line of movement.

Some patties, especially patties of ground beef, contain tissue fibers which may be at first randomly distributed within the formed patty. However, frictional forces applied to the surface of the patty during the operation of the patty-making apparatus tend to unravel or stretch out the tissue fibers in the surface of the patty along the lines of relative movement and tend to orient the tissue fibers into a generally parallel array across the surface or surfaces of the patty. A patty formed with such parallel-oriented tissue fibers presents increased resistance to biting or cutting across the patty in directions not parallel to the oriented surface tissue fibers. Thus, it would be desirable to provide a patty in which the tissue fibers are randomly oriented within the patty and to provide a method and apparatus for making such a patty which tends to prevent the randomly oriented tissue fibers from becoming oriented in a particular direction on the surfaces of the patty.

It would be desirable to provide a patty in which the tissue fibers were not oriented in a single direction for an additional reason related to shrinkage of the patty during cooking. Specifically, with long tissue fibers oriented in the patty in a generally single direction, the tissue fibers, upon being heated during cooking, tend to shrink along their length. If the tissue fibers are oriented generally in one direction, the patty dimension transverse to the tissue fiber orientation shrinks substantially less. Consequently, the cooked patty will have an oval shape which may be aesthetically unattractive and which obviously does not conform to the typical circular hamburger-type bun.

Conventional methods of forming patties of food material rely upon the application of pressure to the material to create a relatively dense patty. It would be beneficial to provide a method for producing a patty having a relatively high degree of porosity—a patty that would then cook more rapidly into a lighter and more juicy product. Further, it would be advantageous if such a method could be used with apparatus in such a way so as to avoid "plugging up" of the patty forming apparatus with food pieces during operation.

SUMMARY OF THE INVENTION

The patty of the present invention comprises a plastic food material, such as ground meat and the like which is subject to shrinkage during cooking. The food material is formed into a patty having a relatively high degree of porosity. In one embodiment of the patty, the food material is formed into a plurality of plugs which are packed together in an array which encloses air in the interstitial regions. This structure promotes more rapid and uniform cooking of the patty and aids in retention of the cooking juices.

According to the method of the present invention, the plastic food material is discharged from a plurality of cavities defined in a foraminous member or through a formaminous plate into a mold to form a patty of relatively high porosity. In one form of the method, the plastic food material is first formed into a plurality of plugs and the plugs are then assembled into a closely packed, but porous array.

More specifically, the patty may be made by feeding a quantity of plastic material in a first direction under pressure through apertures in a plate or into or through a plurality of elongate pressurizable plug forming cavities through the open end of each cavity. After a predetermined amount of material has been so fed, the feeding of the material is terminated. Next the material is discharged or extruded, in a second direction, through or out of the apertures or cavities into a suitable mold.

The bidirectional movement of food material provides an effective self-cleaning action which prevents the cavities from being plugged up by the food material. Specifically, some food material, such as ground beef, contains string-like tissue fibers. During the movement of the food material into the cavities, it is possible that a single tissue fiber may be forced into two or more cavities and then may "hang up" across the cavity openings. Tissue fibers that get caught or hung up during the movement of the food material in one direction are dislodged from the cavities during the subsequent movement in the opposite direction. The continued periodic bidirectional movement of food material into and out of the cavities thus continuously removes any "plugging" material.

In an embodiment where the food material is extruded as plugs through plug forming cavities, the mold preferably includes an impingement surface spaced from the open ends of the plug forming cavities so that the plugs of material discharging from the cavities are directed against the impingement surface. This causes the plugs of material to circumferentially expand so that portions of each plug come into contact with portions of adjacent plugs thereby flattening the walls of the plugs along the areas of contact. At the same time, interstitial voids are necessarily formed between other portions of the plugs for entrapping air therein and for aiding in retention of cooking juices.

One embodiment of the novel apparatus for forming the unique patty of the present invention in accordance with the method of the present invention includes a hopper for holding a supply of plastic food material, a pressurizable feed chamber communicating with the hopper to receive food material from the hopper, and a means for feeding the material from the hopper within the pressurizable feed chamber. The apparatus further includes a multi-cylinder plug forming block containing a plurality of plug forming cavities, with each plug forming cavity having an open end. A piston is slidably disposed within each plug forming cavity and is adapted to move from a retracted loading position to an extended discharging position within the cavity.

A mold is provided for being aligned with the plug forming cavities after they have been filled with the food material and for receiving the discharging plugs of material as the pistons are moved to the discharging position within plug forming cavities.

Preferably the mold has a cylindrical side wall and includes an impingement wall or surface opposite the plug forming cavities against which the discharging plugs of material impinge to cause circumferential expansion of the plugs within the mold to form a circular patty of expanded plugs in a closely packed array within interstitial voids defined between adjacent plugs.

In another embodiment of the apparatus, the multi-cylinder plug forming block is substantially reduced in thickness so that it, in effect, becomes a relatively thin plate with a plurality of apertures. Instead of individual pistons in each aperture, a single piston is provided in a receiving chamber above the plate. Food material is first forced through the apertures in the plate and then into the receiving chamber. Subsequent movement of the piston toward the plate squeezes the food material back through the apertures as relatively thin extrusions which tend to curl and which expand and join together to form a relatively porous patty in the mold.

Numerous other advantages and features of the present invention will become readily apparent from the following detailed description of the invention and embodiments thereof, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a perspective view of one embodiment of the apparatus of the present invention shown operably associated with a horizontal patty conveyor, of which only a fragmentary portion is illustrated;

FIG. 2 is an enlarged, fragmentary, perspective view of part of the upper portion of the apparatus illustrated in FIG. 1 showing the molding region in more detail;

FIG. 3 is a view similar to FIG. 2 but with the molding mechanisms and cover plates removed to better illustrate the food material feed chamber and feed mechanisms;

FIG. 4 is a view similar to FIG. 3 but showing the food material being pressurized by the feed mechanism and the closure plate actuator moved outwardly by the pressurized food material;

FIG. 5 is an enlarged, fragmentary cross-sectional view of the feed mechanism taken generally along the plane 5—5 in FIG. 4 and showing three moved positions of the mechanism in dashed lines;

FIG. 6 is a view similar to FIG. 4 but with the cover plate and closure member in place over the feed chamber;

FIG. 7, located on the sheet of drawings along with FIGS. 1 and 2, is a greatly enlarged, prespective, fragmentary view of the multiple pressurizing cylinder and piston assembly with a portion broken away to better illustrate the assembly;

FIG. 8 is a cross-sectional view taken generally along the plane 8—8 in FIG. 2 showing the multiple pressurizing cylinder/piston assembly being filled with food material;

FIG. 9 is an enlarged, fragmentary, cross-sectional view taken generally along the plane 9—9 in FIG. 8;

FIG. 10 is a fragmentary, cross-sectitonal view similar to FIG. 9 but showing the mold transfer plate moved to the patty molding position;

FIG. 14 is a fragmentary, cross-sectional view similar to FIG. 12 but showing the transfer plate carrying a molded patty and moved to the patty ejecting position;

FIG. 15 is a greatly enlarged, diagrammatic view of a portion of FIG. 12 to show the plugs of food material as they are discharged from the pressurizing cylinders into the mold cavity;

FIG. 16 is a view similar to FIG. 15 but at a later point in time to show the plugs of food material discharging from the pressurizing cylinders, expanding, and contacting adjacent plugs of food material;

FIG. 17 is a diagrammatic illustration of one embodiment of a patty of food material of the present invention formed in accordance with the method of the present invention;

FIG. 18 is a greatly enlarged, fragmentary, perspective view of a small portion of the patty illustrated in FIG. 17;

DESCRIPTION OF THE PREFERRED EMBODIMENT

Figure 11:
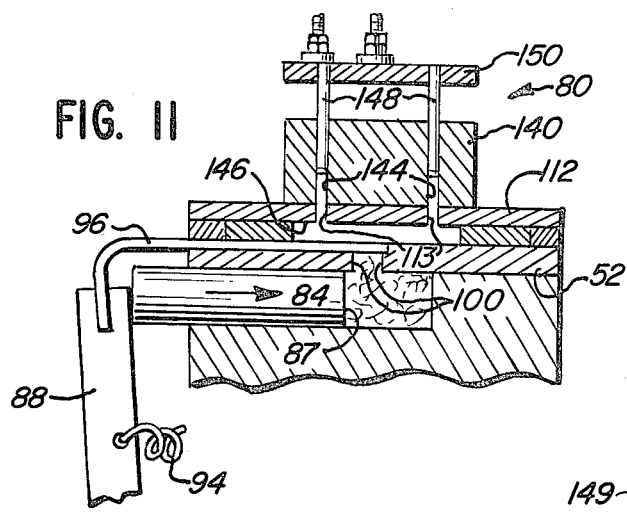
FIG. 11 is a slightly reduced cross-sectional view taken along the plane 11—11 in FIG. 10.

While this invention is susceptible of embodiment in many different forms, there are shown in the drawings and will herein be described in detail preferred embodiments of the invention. It should be understood, however, that the present disclosure is to be considered as an exemplification of the principles of the invention and not intended to limit the invention to the embodiments illustrated.

The precise shapes and sizes of the components herein described are not essential to the invention unless otherwise indicated, since the invention is described with reference to an embodiment which is simple and straightforward.

It will be understood that references made herein, and in the claims, to various terms such as "food material," "tissue," "fiber," and "cooking juices," are used herein in a non-technical sense, and are intended to include various substances exhibiting the characteristics discussed hereinafter and to which this invention is directed.

For ease of description, the apparatus of this invention will be described in a normal operating position and terms of upper, lower, horizontal, etc., will be used with references to its normal operating position. It will be understood, however, that the apparatus of this invention may be manufactured, stored, transported, and sold in an orientation other than the normal operating position described.

The apparatus of this invention has certain conventional drive mechanisms and control mechanisms the details of which, though not fully illustrated or described, will be apparent to those having skill in the art and an understanding of the necessary functions of such mechanisms.

The apparatus of the present invention may be constructed of many types of materials. The choice of material in some cases is dependent upon the particular application involved and other variables, as those skilled in the art will appreciate.

The molding apparatus of the illustrated embodiment of the apparatus 30 of the present invention comprises a base 32 on which is supported an upstanding frame or enclosure 34 which, among other things, supports and encloses various drive mechanisms and controls for operating the apparatus that will be explained in more detail hereinafter. Mounted to the top of the enclosure 34 is a hopper 36 which comprises a supply means for moldable plastic material or food material 38, such as ground meat and the like.

The apparatus forms a novel patty of food material, such as finished patties 40 shown being carried away from the apparatus 30 on a endless belt conveyor 42. The conveyor 42 may be of any suitable design and is not a part of the apparatus of the present invention. Typically, however, the conveyor 42 has means, not illustrated, associated with it for dispensing patty separators or squares of paper 44 on the top of the conveyor 42 so that the completed patties 40 may be discharged onto such papers 44 from the apparatus 30.

In the apparatus 30 of the present invention the plastic food material 38 is fed under pressure from the hopper 36 into a novel molding mechanism 50 at the forward end of the apparatus 30, the principal parts of which are illustrated separately in FIG. 2.

The molding mechanism 50 has a combination cover plate 52 (FIGS. 2 and 6) which forms the top wall or cover of a pressurizable material feed chamber 54 (best illustrated in FIG. 3 wherein the cover plate 52 has been removed to permit viewing of the material feed chamber 54). As can be seen in FIG. 3, the chamber 54 is located adjacent a side wall of hopper 36 at the bottom of the hopper and in alignment with a hopper discharge aperture 56. The chamber is defined by the cover plate 52 (FIG. 6), by side wall 58, by side wall 60, by end wall 59, by bottom member 61 (FIG. 10) and by a movable bottom plate 62 which is slidably supported on bottom member 61 and covers an aperture 63 therein.

The plastic food material, such as ground meat, is moved or conveyed forward from the hopper 36 through aperture 56 by a suitable conveying mechanism, preferrably one capable of pressurizing the material 38 within the chamber 54. Specifically, with reference to FIGS. 3 and 5, the bottom plate 62 is adapted to reciprocate longitudinally within the chamber 54 on bottom member 61 and has a plurality of first apertures 64 and a second aperture 66. A plurality of driven feed prongs or pins 70 are mounted from below the plate 62 and are adapted to project upwardly and forwardly in an inclined orientation through the apertures 64. Similarly, a feeder bar 72 is adapted to project upwardly through laterally elongated aperture 66 in an inclined orientation forwardly of the pins 70.

The pins 70 and feeder bar 72 are mounted to a drive plate (not illustrated) which is adapted to reciprocate by a suitable drive means (not illustrated) in a longitudinal direction with respect to the feed chamber 54 and to simultaneously be raised and lowered so that the pins 70 and feed bar 72 describe a generally rectangular four motion path.

As best illustrated in FIG. 5, this path is in a cycle of four successive movements. The first movement starts with the pins 70 and bar 72 in the raised position as illustrated in solid line in FIG. 5. The first movement is horizontal from left to right to feed the material 38 forward. The next movement is downwardly to bring the tops of pins 70 and the top of feeder bar 72 below the top surface of the bottom plate 62. The third movement is horizontal and rearwardly from right to left and the last movement is upwardly to project the pins 70 and feeder bar 72 through their respective apertures into the food material 38—the beginning position illustrated in solid line.

The construction and operation details of the feed mechanism, including the drive means therefore, are well known to those skilled in the art and are described in great detail in U.S. Pat. No. 3,293,688. Attention is directed thereto, especially to FIG. 8 of that patent which illustrates a feeder bar 85 and pins 81, as well as to columns 5, 6 and 7 which describe a drive means for such a feeder mechanism.

Any suitable feed mechanism may be used with the apparatus in the present invention and the mechanism described above having the pin 70 and the feeder bar 72 is merely illustrative of one type that may be used. The specific feeder construction, per se, forms no part of the present invention.

In any event, regardless of the specific type of feed mechanism employed by the apparatus of the present invention, the food material 38 is moved forwardly to fill the entire food chamber 54 as illustrated in FIG. 4. The feeding mechanism continues feeding the material until material is packed tightly within the feed chamber 54 and begins to exert an outwardly directed pressure on the inside surfaces of the feed chamber 54. A novel device is provided for sensing the pressure build-up within the feed chamber 54 and for opening the chamber 54 to permit a portion of the food material to fill a novel multiple pressurizing cylinder/piston assembly on molding device mounted above the chamber 54 and generally designated by numeral 80 in FIG. 2.

Specifically, side wall 58 of feed chamber 54 has a guide sleeve 82 formed therein. A pressure sensing means or piston 84 is slidably disposed within guide sleeve 82 and has a solid end face 87 (FIG. 11) generally parallel to the side walls 58 and 60. This face 87 is adapted to be contacted by the food material 38. The pressure sensing piston 84 projects outwardly from the guide sleeve 82 and has an end wall 86 adapted to engage an upstanding actuating member 88 which is pivotably mounted, as is best illustrated in FIG. 1, on the apparatus base 32 by pin 90 between brackets 92. The feeding pressure within chamber 54 thus causes the piston 84 to move outwardly with respect to the chamber.

Member 88 is biased inwardly to force the sensing piston 84 inwardly in feed chamber 54 by two springs 94 which are always under tension and which are secured between the member 88 and a suitable anchor (not illustrated) within the enclosure 34. Thus, when the chamber 54 is full of material 38 but not subject to feeding pressure, or when the chamber is empty, the piston 84 is in the inwardmost position as illustrated in FIG. 3.

Mounted to the upper end of member 88 is an L-shaped slidable closure plate 96 which is best illustrated in FIGS. 6, 8 and 11. The closure plate 96 is adapted to reciprocate transversely of the feed chamber 54 in a slot 97 in the cover plate 52. Cover plate 52 also has a feed aperture 100 which is closed by closure plate 96 when the closure plate is moved to its inwardmost position (FIG. 11). The aperture 100 is open when closure plate 96 is moved to its outwardmost position (FIG. 6).

As can be seen from FIGS. 2 and 6, the feed aperture 100 and closure member 96 are located below the multi-cylinder molding device 80. The molding device 80 is mounted directly to a support plate 112 which in turn is supported above cover plate 52 by spacer bars 114 and 115 on either side of the support plate 112. Mounting plate 112 has a plurality of plug forming cavities 113 in communication with the mold device 80.

Figure 12:
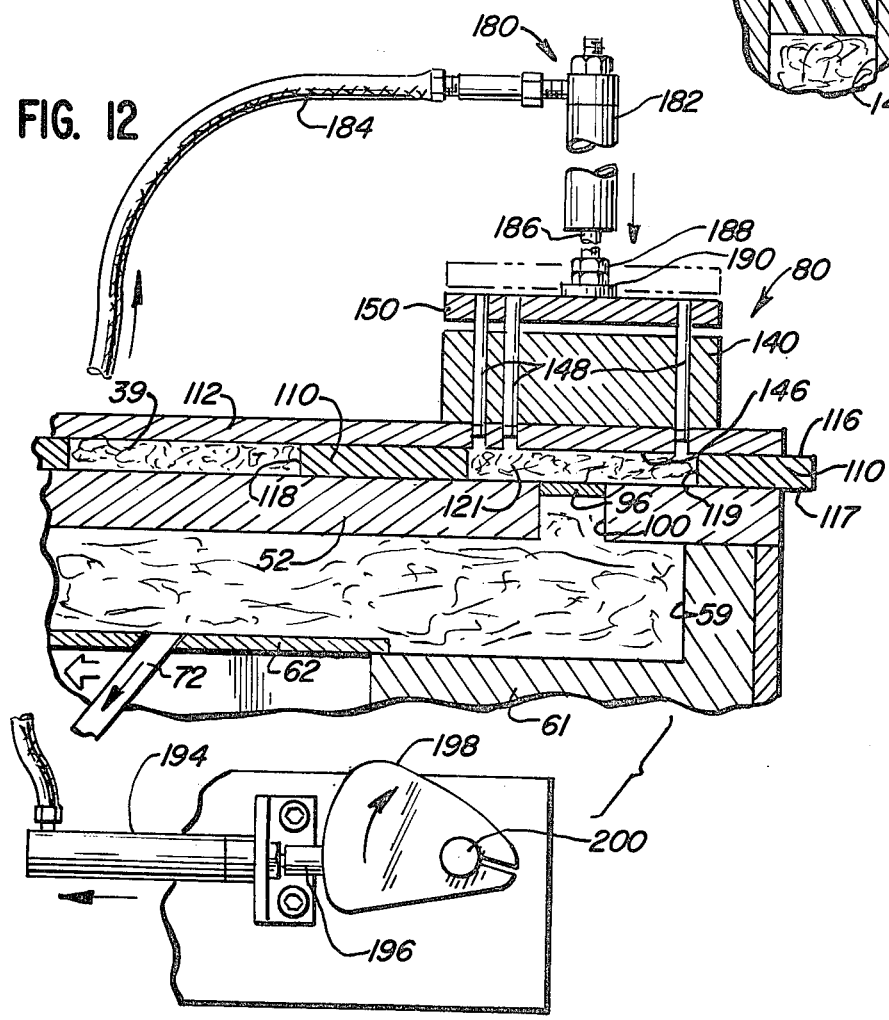
FIG. 12 is a fragmentary cross-sectional view similar to FIG. 10 but showing the pressurizing pistons in the downwardmost positions and showing a formed patty of food material in the mold cavity of the transfer plate.

A reciprocating transfer plate 110 is slidably disposed between the cover plate 52 and the support plate 112. The transfer plate 110 has two opposed, parallel flat surfaces 116 and 117 (FIGS. 9–12) by which the plate 110 is specifically adapted to slide between the cover plate 52 and the mounting plate 112. The plate 110 has a transfer cavity or feed passage, such as aperture 118 through which food material 38 is fed through the cavities 113 in plate 112 to the molding device 80 as illustrated in FIGS. 8 and 9. Plate 110 also has an aperture of cavity 119 which functions as a mold opening in which a patty of food material is eventually molded by the molding device 80 in conjunction with the underlying surfaces of the cover plate 52 and the closed closure member 96 as illustrated in FIG. 12 for a patty 121.

The transfer plate 110 is reciprocated between a patty discharge or ejecting position (FIGS. 2 and 14) and a patty molding position (FIGS. 10, 11 and 12) by any suitable reciprocating drive mechanism of which there are many known to those skilled in the art. In the embodiment illustrated, the end of transfer plate 110 is shown mounted to, and guided by, a pair of rods 120 (FIGS. 1 and 2) via brackets 122. As best illustrated in FIG. 1 for the near side of the apparatus 30, each bracket 122 is connected to a linkage system, which includes link members 124, 126 and 128. By appropriate movement of link 128 through a suitable cam and gear transmission system (not illustrated, but located within enclosure 34), the transfer plate 110 can be intermittently reciprocated between the patty ejecting position and the molding position. Conventional lost-motion linkages may be employed to effect this intermittent motion. The mechanisms for producing such intermittent reciprocating motion of the transfer plate 110 from a central rotating drive shaft or other drive devices are numerous and well known to those skilled in the art. Hence, a detailed illustration of such a mechanism and a detailed description of its operation are not necessary here. The specific design per se, of the mechanism for effecting the reciprocating movement of the transfer plate 110 is not part of the present invention, though the combination of a suitable mechanism with other features described herein constitutes a form of the apparatus of the present invention and permits an apparatus to effect one form of the method of the present invention.

When the transfer plate 110 is in the patty discharge or ejecting position (FIGS. 2, 8, 9, and 14) the food material 38 is forced from the feed chamber 54 through the feed aperture 100, through the transfer cavity 118 in the transfer plate 110 and then through the support plate cavities 113 into the molding device 80. To this end, the molding device 80 is mounted to the plate 112 directly above, and in alignment with, the feed chamber aperture 100 and includes a multi-cylinder block 140 which contains an array of plug forming bores or cavities 144 which are aligned with the cavities 113 in plate 112. Preferably the plug forming cavities 144 extend completely through the block 140 and each aligned pair of cavities 113 and 144 define a generally elongate prismatic volume such as a right cylinder. Preferably the cylindrical plug forming cavities 113 and 144 are arranged in a generally uniform array in the block 140 and plate 112. The plate 112 has a bottom surface 146 defining therein the bottom open ends of the cavities 113 in a plane normal to the longitudinal axes of the cylindrical cavities 113.

It is to be noted that the cross-sectional views of the multi-cylindered mold device 80 and plate 112 shown in FIGS. 8, 9, 10, 11, 12 and 14 are somewhat simplified in that they illustrate only two or three of the plug forming cavities 113 and 144. It is to be understood that plate 112 and block 140 preferably have a large number of plug forming cavities, e.g., 150 or more.

As is best illustrated in FIG. 7, a piston 148 is slidably disposed within each plug forming cavity 144 and is adapted to move longitudinally within each plug forming cavity 144 from a retracted loading position (FIGS. 8, 9, 10 and 11) to an extended plug discharging position (FIGS. 12 and 14). To this end, one end of each of the pistons 148 is suitably mounted to or held within upper mounting block 150.

With reference to FIGS. 2, 8, 9, 10 and 11, it can be seen that the block 150 and the pistons 148 mounted thereto are not rigidly fixed to any support structure and therefore "float" with respect to, and above, the lower block 140. As best illustrated in FIGS. 2 and 8, a stop means 154 is mounted above the block 150 to limit the upward travel of the block and to thereby determine the maximum internal volume defined within the plug forming cavities between the bottom open ends of the cavities 113 and the pistons 148 therein.

As shown in FIG. 2, the stop means 154 is mounted on a support stand comprising two vertical members 156 and 158, two parallel cross members 160 and 162 mounted to the vertical members 156 and 158, and a generally horizontal plate 164 secured to bottoms of members 160 and 162. Plate 164 has a threaded aperture (not visible in FIG. 2) for receiving the stop means 154. Specifically, stop means 154 comprises a threaded rod 168 which is threadingly engaged with the plate 164 through the aperture therein and has on the lower distal end thereof a nut 170 and threaded stop member 172. The vertical height of the threaded stop member 172 above the mold device 80, and hence, above the upper mounting block 150, can be varied by appropriate adjustment of the threaded rod 168.

The upper piston mounting block 150 is urged downwardly to form the patty in the mold opening 119 of the transfer plate 110, as will be explained in more detail hereinafter, by a hydraulic actuator means 180. The hydralic actuator means 180 is mounted through an aperture (not illustrated) in plate 164 above the block 150 and comprises a hydraulic actuating cylinder 182 which is supplied with hydraulic fluid through hydraulic line 184. A piston rod 186 projects downwardly from cylinder 182, with a threaded portion at the distal end of the rod carrying a nut 188 and a bearing member 190 which is adapted to bear against the top surface of the mounting block 150. The bearing member 190 is not connected to the block 150 but is at all times in surface-to-surface contact therewith.

The actuator means 180 is intermittently pressurized through hydraulic line 184 by a hydraulic cylinder 194 (FIG. 12) which has a projecting piston rod 196 adapted to be engaged by a rotating cam 198. Cam 198 is mounted to a drive shaft 200 which is rotated by a suitable drive means at a predetermined, but preferably adjustable, frequency. The shaft 200 may be driven through a gear transmission system (not illustrated) by a motor which also reciprocates the transfer plate 110 as previously discussed. Alternatively, the shaft 200 may be rotated by a separate motor and control system if desired.

Figure 13:
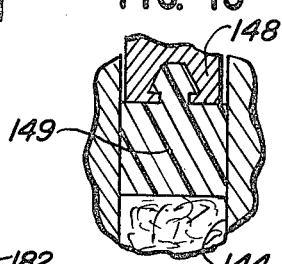
FIG. 13 is a greatly enlarged, fragmentary, cross-sectional view of the distal end of one of the pressurizing pistons of the first embodiment of the apparatus of the present invention.

To prevent the food material 28 from passing upwardly in any annular clearance region between each piston 148 and its pair of aligned cavities 113 and 144, a resilient plug 149 can be secured to the end of each piston as illustrated in FIG. 13. When food material is under pressure in the cavities, each plug 149 is compressed in the longitudinal direction of the cavity so that the diameter of the plug increases so that the exterior surface of the plug is tightly forced against the wall of the cavity. Typically the plug 149 is fabricated from a thermoplastic material having a relatively low coefficient of sliding friction so as not to unduly inhibit the reciprocating motion of the pistons 148 within the cavities.

A mold patty, such as patty 121 in FIG. 14, may be ejected from the mold opening 119 in the transfer plate 110 by a knock-out device 220 as illustrated in FIGS. 2 and 14. The knock-out device includes a vertical movable cup 222 that is reciprocated in a vertical direction as shown by the arrow 223 in FIG. 14 into and out of the mold opening 119 during a pause in the movement of the transfer plate 110. The knock-out device 220, including the cup 222 and apparatus for moving it in a vertical direction 223 may be of any of those customarily used and widely known. Examples of such knock-out or patty removing apparatus are shown and described in U.S. Pat. Nos. 2,293,688 and 2,417,425.

The operation of the apparatus in the disclosed embodiment is believed to be obvious from the above description. However, a brief summary of the operation is as follows.

Plastic food material, such as ground meat and the like, is loaded in the hopper 36 as illustrated in FIG. 1. The material 38 is fed from the hopper 36 into the feed chamber 54 and from there into the mold device 80 by the feeder means comprising the pins 70 and bar 72 as is best illustrated in FIGS. 3 and 4. During this initial feeding and pressurization stage, the transfer plate 110 is in the position illustrated in FIGS. 8 and 9 with the transfer cavity 118 aligned over the aperture 100 in cover plate 52.

As pressure builds up within the chamber 54, the pressure sensing piston 84 is moved outwardly by the food material 38 as illustrated in FIG. 8. The pressure within the chamber 54 is diagrammatically illustrated in FIG. 8 by the outwardly radiating arrows 260. The piston 84 moves outwardly against the inwardly biased member 88, overcoming the force of the springs 94, so that the closure member 96 is carried with the member 88 to the outermost position illustrated in FIG. 8 to open the aperture 100 and permit the pressurized food material 38 to flow into the transfer cavity 118, through the plurality of aligned plug forming cavities 113 in support plate 112, and into plug forming cavities 144 in the block 140. As this occurs, the pistons 148 within the cavities are pushed upwardly. The upper plate 150 to which the pistons 148 are mounted is thus moved upwardly and forces the hydraulic actuator bearing member 190 upwardly also. At this point the cam 198 (FIG. 1) is in an orientation which permits piston rod 196 to extend to its outermost position with respect to its cylinder actuator 194 so that the hydraulic fluid within the cylinder actuator 182 may be discharged from the actuator 182 through the hydraulic line 184 and into the cylinder actuator 194. Thus, cylinder actuator 182 is not pressurized at this point and the bearing member 190 is free to move upwardly in response to the upward force exerted on it by the upwardly moving block 150.

Eventually the food material within the plug forming cavities raises the pistons 148 to a predetermined elevation whereat the block 150 contacts the stop member 172. Further feeding of material 38 causes a greater pressurization with the feed chamber 54 and within the plug forming cavities.

Next, the feeding pressure is subsequently reduced and the closure member 96 moves from the open position to the closed position over aperture 100 as illustrated in FIG. 11. To this end, the stroke of the feeder mechanism, that is, the forward stroke of the pins 70 and bar 72 in the horizontal forward direction with the feed chamber 54 (FIGS. 3, 4 and 5), is adjustable and is set to feed a predetermined amount of material with each forward stroke at a predetermined pressure when the upper block 150 is abutting the stop member 172. When the pins 70 and bar 72 are retracted downwardly through the reciprocating plate 62 (FIG. 5), the pressure within the chamber and, hence, within the plug forming cavities, is reduced substantially. With little or no pressure on sensing piston 84, member 88 and plate 96 are then urged inwardly by the springs 94, as illustrated in FIG. 11, to close aperture 100.

In the next step, the transfer plate 110 moves to the molding position illustrated in FIG. 10 to align the mold opening 119 under the mold device 80 after the plug forming cavities 144 have been filled with a predetermined amount of material 38 at a predetermined pressure. When this occurs, the transfer cavity 118 necessarily shifts, to the left in FIG. 10, with a residue supply of food material 39 still eventually to be forced into the plug forming cavities when the entire cycle is repeated.

In order to prevent material from being fed from the chamber 54 into the empty mold opening through aperture 100, it is necessary that the closure member 96 completely close the aperture 100 before the transfer plate 110 is moved. To this end, the timing of the reciprocation of the transfer plate 110 is correlated with the timing of the feeder mechanism in chamber 54 so that the plate 110 is not moved until the feeder pins 70 and feeder bar 72 have retracted below the chamber 54 as illustrated in FIG. 10 and the closure member 96 has completely closed off the aperture 100. The timing of the transfer plate reciprocation can be accomplished directly through conventional linkages, lost motion or otherwise, with the drive mechanism for the feeder pins 70 and bar 72. Alternatively, if the transfer plate were reciprocated by separate drive mechanisms, a suitable position switch and associated control system may be employed to sense when the closure member 96 has completely closed off the aperture 100 and to actuate the movement of the transfer plate 110 at that point in time.

In any case, when the transfer plate 110 has been moved to the patty molding position illustrated in FIG. 10, the plugs of food material within the plug forming cavities are next discharged into the mold opening 119. FIG. 12 shows the material formed into a patty 121 in the mold opening 119. The timing of cam 198 is set so that the piston rod 196 is pushed to its innermost position by cam 198 to pressurize the actuator 182 and cause downward movement of the block 150 and of the pistons 148 mounted thereto. The timing of the cam 198 may be accomplished through a mechanical system in conjunction with the movement of a transfer plate 110 and the feeder pins 70 and feeder bar 72. Alternatively, if the cam 198 is separately driven, the cam drive may be made directly responsive to the position of the transfer plate 110 through a suitable position switch and control circuit.

In any event, downward movement of the pistons 148 within the plug forming cavities causes the discharge or extrusion of a portion of the food material from each cavity and forces the material against the lower surface of the mold opening 119 which, in the illustrated embodiment in FIG. 12, is defined by a portion of the top surfaces of the cover member 52 and of the closure member 96.

The top surfaces of the cover plate 52 and closure plate 96 function as a mold impingement surface against which the leading ends of the plugs of food material impinge as best illustrated in FIGS. 15 and 16. FIG. 15 shows a greatly enlarged view of a portion of the support plate 112 with the plurality of cavities 113 therein and the plugs of food material 38 being forced from the open ends of the cavities against the top surface of the cover plate 52. As each plug of food material impinges against the top surface of the cover plate 52 and pistons 148 continue to move downwardly, the diameter of the plug increases so that the plug expands circumferentially.

As illustrated in FIG. 16, as more and more material is forced into the mold opening by the pistons 148, the plugs of material circumferentially expand in directions generally perpendicular to the discharge or extrusion direction so that exterior portions of each plug come into contact with portions of adjacent plugs and so that the contacting portions are somewhat flattened. As these expanded plugs are formed within the mold opening 119, air in the mold opening is trapped within the interstitial voids between portions of adjacent plugs.

The extruded and expanded plugs are thus formed in a packed array to form the patty 121 as diagrammatically illustrated in FIG. 17. An enlarged portion of patty 121 is shown in perspective in FIG. 18 wherein the expanded plugs 300 are shown with exterior portions in contact with other adjacent plugs and with interstitial voids 310 defined between other exterior portions of adjacent plugs.

Preferably the pistons 148 are not moved downwardly an amount that would cause them to project into the mold opening 119. To this end, the length of the pistons 148 is adjusted so that when the upper piston molding block 150 moves to its downwardmost position, as illustrated in FIG. 12, the distal ends of the pistons 148 are still located within the cylinders 113 of the support plate 112 so that the distal ends are spaced away from the mold opening 119 and hence away from the molded patty 121 therein as clearly illustrated in the enlarged view of FIG. 16.

After the patty 121 has been formed, the transfer plate 110 is subsequently reciprocated to the patty ejecting position as illustrated in FIG. 14 so that the patty 121 can be ejected by knock-out device 220 downwardly onto the receiving paper 44 on belt conveyor 42.

When the patty 121 is in the ejection position illustrated in FIG. 14, the transfer cavity 118, which is still filled with the residual food material 39, is necessarily positioned below the mold device 80 and above the transfer aperture 100.

At this point the feeder mechanism, comprising the feeder pins 70 and bar 72, has been moved rearwardly below the chamber 54 and then up again into the chamber as illustrated in FIG. 5 to begin a new forward feeding movement. At this point the sequence can be repeated to form another patty. However, the chamber 54 is now fully filled with material 38 and the transfer cavity 118 is filled with the residual material 39 which, when the closure plate 96 opens, will be pushed into the plug forming cavities, along with additional material 38 from the chamber, if necessary, to completely fill the cavities 144.

It is thus seen that the apparatus of the present invention forms a novel patty in a unique manner. The patty is seen to comprise a plurality of plugs of food material packed together in an array defining interstitial voids adjacent each plug so that the patty has a predetermined degree of porosity permitting penetration of air with the patty. This promotes more rapid and uniform cooking of the patty and aids in retention of the cooking juices.

Preferably the patty is formed in the apparatus of the present invention so that it has a generally disc-like configuration with two spaced-apart, major, parallel, exterior, side surfaces and a peripheral surface connecting the two major, exterior, side surfaces. Preferably, the patty has a generally right cylindrical shape.

The plugs of food material forming the patty are preferably generally cylindrical in shape though, owing to the flattening of the sides of the plugs, the plugs do not have a perfect or true cylindrical shape. In any case, however, the shape of the plugs is prismatic and preferably the top and bottom end surfaces of each plug are generally parallel.

The patty is formed so that air is initially trapped in the interstitial spaces or regions between the expanded plugs of food material. Further, during cooking, some of the gases generated by the cooking process and some air may flow out of the interstitial regions. On the other hand, exterior, ambient air may flow into or otherwise penetrate the interstitial regions during storage of the patty and/or during cooking. Such a patty has been found to have an unusual degree of fluffiness or lightness and has been found to cook extremely well with a high degree of retention of the cooking juices. Owing to the use of a regular array of plugs of food material, the cooking of the patty can be effected with a relatively high degree of uniformity across the patty.

Patties of ground beef, made in accordance with the present invention, have been found to exhibit as little as a 6% weight loss during cooking. As an example, 4 ounce patties of the present invention were found to cook rapidly and to have an average weight of about 3.75 ounces after cooking. In contrast, the conventionally made 4 ounce patties did not cook as quickly and had an average weight of between only 3 and 3.25 ounces after cooking under identical cooking conditions.

Figure 19:
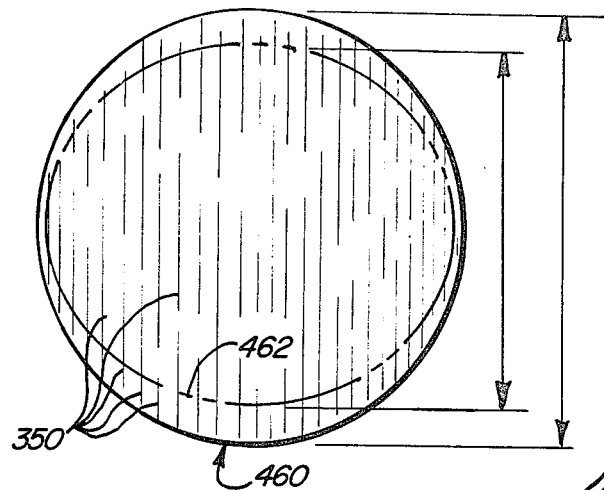
FIG. 19 is a diagrammatic illustration of the patty of food material formed in accordance with the teachings of the prior art.
Figure 20:
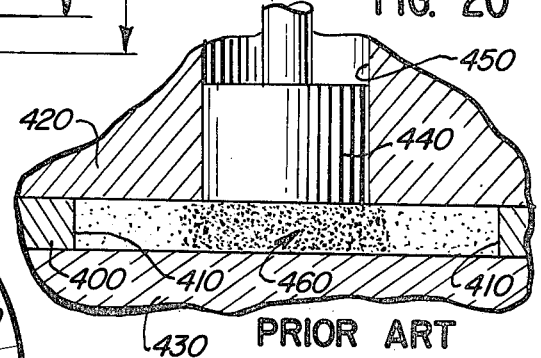
FIG. 20 is a fragmentary, diagrammatic illustration of a method of forming a patty of food material in accordance with the teachings of the prior art.

Many ground food materials, and especially ground meat, contain string-like tissue fibers which, when the food material is formed into patties, are distributed within the patty. When such material is initially ground, the tissue fibers are essentially "balled" up, so that their string-like nature is not visibly apparent. However, when the ground material is moved across stationary contacting surfaces during formation of the patty, some of the tissue fibers unwind and may become aligned in the direction of movement of the ground material and/or patty (or in the direction of movement of any surface moving against a stationary patty or mass of ground material). This situation is illustrated in FIG. 19 wherein vertical striations 350 are diagrammatically depicted to show the relative direction of movement between a patty 460 and a surface that has been in contact with the surface of the patty during its formation in accordance with prior art techniques. The tissue fibers in the patty will tend to become oriented in parallel lines and to align, at least in the surface of the patty, along the striation lines 350. When the patty is cooked, the tissue fibers contract during the cooking process and cause a shrinkage of the patty in the striation direction. The patty does not shrink as much in the direction perpendicular to the aligned tissue fibers so that the resulting patty, though initially formed with a circular shape, assumes a somewhat oval shape, indicated in broken line 462 in FIG. 19, after cooking.

In contrast, with the method of the present invention, forces tending to unwind the tissue fibers are minimized so that the tissue fibers are generally randomly distributed in one or more of the plugs of material and are not as readily unraveled into a generally straight line configuration when the patty surface is subject to friction forces in one direction, as when transferring the patty in a mold transfer plate from one position to another. Since the tissue fibers do not as easily unravel from a random orientation within each plug (or from within a small number of adjacent plugs), the generally random orientation of the tissue fibers in the patty of the present invention is maintained. Thus, when the patty of the present invention is cooked, the shrinkage is generally circumferentially uniform so that the patty maintains the generally circular shape.

The novel method of forming the patty of the present invention provides a patty which is generally of uniform density across its diameter. Patties formed by some typical prior art apparatus do not have such a uniform density, and do not cook uniformly.

A prior art apparatus for forming a patty of plastic food material is described in U.S. Pat. No. 4,043,728 and is diagrammatically illustrated in FIG. 21. A mold plate 400 is provided with a mold opening 410 and is mounted between an upper plate 420 and a lower plate 430. A piston 440 is slidably disposed within a cylinder or bore 450 in the upper plate 420 and is adapted to be moved downwardly to force food material (previously loaded into the cylinder 450) into the mold opening 410. The piston 440 has a diameter that is generally substantially less than the diameter of the completed, molded patty 460. Consequently, the food material in the patty directly under the piston 440 is pressurized to a greater extent than material at the periphery of the patty.

Figure 21:
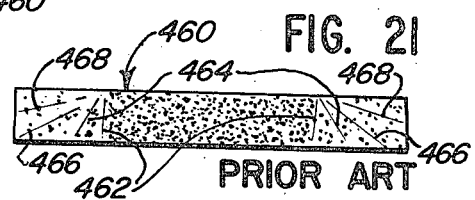

The final density gradation within such a patty is diagrammatically illustrated in FIG. 21 wherein lines 462 represent the boundary of the cylindrical region under the piston which was subjected to the highest pressure and which is therefore of the highest density. Lines 464 indicate a constant, but less density, than existing in the region within lines 462. Similarly, lines 466 represent a constant density which is less than at lines 464 and 462. Lines 468 represent a density even less than that existing at lines 466. Though the density variation within the patty is illustrated by straight lines (forming frustoconical surfaces in three dimensions), it is to be understood that the constant density lines may be slightly curved, depending on the actual molding conditions. The lines shown in FIG. 21 merely illustrating, in simplified fashion, the general variation in density throughout the patty.

Figure 22:
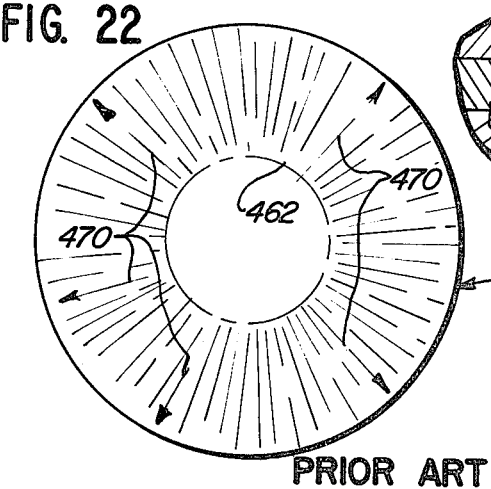
FIGS. 21 and 22 are diagrammatic illustrations of a patty formed in accordance with the teachings of the prior art.

FIG. 22 shows the patty 460 illustrated in FIG. 21 in plan view with the higher density region defined within circle 462 and with the density of the patty decreasing radially upwardly therefrom in the direction of the arrows 470. It will be readily appreciated that patties of the type shown in FIGS. 21 and 22 will cook unevenly, and they also tend to assume a dome shaped configuration after cooking.

With the patty of the present invention, all of the plugs of material in the array forming the patty are formed by pistons under the same amount of pressure. Hence, the pressure within each plug is identical and there is little if any pressure difference across the patty as the patty is being formed and in the complete patty. Consequently, to the extent that uniform density promotes a more uniform cooking of the patty, the patty of the present invention is an improvement over the above-discussed prior art patty.

Figure 23:
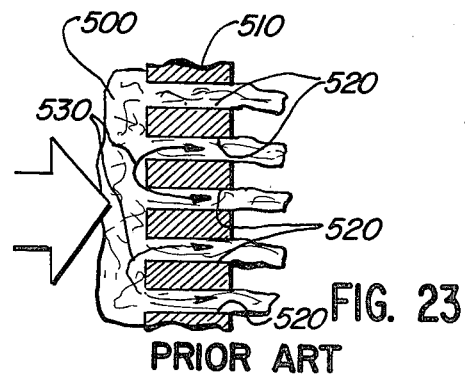
FIG. 23 is a fragmentary, diagrammatic illustration of a method of extruding ground food material, such as in a meat grinder, as is well known in the prior art.

Although it may be possible to form the plugs of material of the present invention by directly extruding material through a die, as diagrammatically illustrated for a meat grinder extruder head in FIG. 23, certain disadvantages may be encountered with this method. Specifically, the material 500 is forced against a die 510 having bores 520 therein. Plugs of the material 500 are thus extruded through the bores 520. However, if the material, such as ground meat, contains tissue fibers 530, end portions of a single fiber 530 can be forced through different bores 520. The fibers 530, being small and stringy, are not easily cut and tend to plug up the die 510 instead of passing completely through the bores 520. Eventually, such a meat grinder die must be cleaned out and the tissue fibers removed from the forward side of the die.

Figure 24:
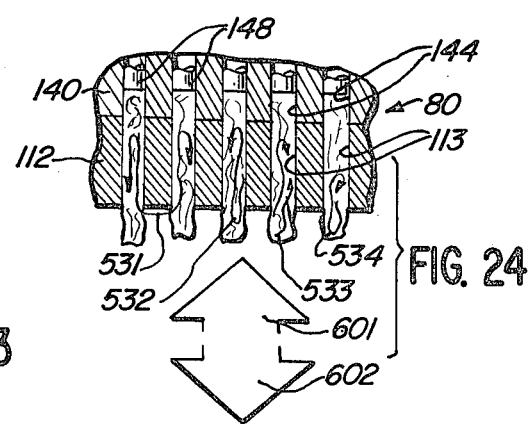
FIG. 24 is a fragmentary, diagrammatic, cross-sectional view of plugs of ground meat containing tissue fibers as the plugs are discharged from the plug forming cavities of the first embodiment of the apparatus of the present invention.

In contrast, the novel apparatus of the present invention, according to one form of the novel method of the present invention, both loads and discharges the plug forming cavities from the same open end as diagrammatically illustrated in FIG. 24 for a portion of a mold apparatus 80. Specifically, as the material is pushed upwardly in the direction of arrow 610 to fill the cavities 113 and 144 in the plate 112 and block 140, respectively, the tissue fibers 531, 532, 533 and 534 are forced into the cavities. A portion of one fiber 531 may be forced in one cavity and the remaining portion of that fiber may be forced into an adjacent cavity. However, since the plugs of food material are subsequently discharged downwardly in the direction of arrow 620 by the pistons 148, the tissue fiber 531 that is partially disposed in more than one cavity is easily expelled with the formed plugs of material. Thus with the apparatus of the present invention, the multi-cylinder mold device cannot be easily plugged up by tissue fibers.

It is also seen that since each plug is a somewhat self-contained unit having its own boundary surfaces (see FIGS. 16, 17 and 18), the fibers within a plug, or within a plurality of adjacent plugs, are not easily moved by frictional forces across the patty from plug to plug into a straight line orientation. Consequently, a patty formed in accordance with the invention, and by the apparatus of the present invention, can have a great number of randomly oriented tissue fibers which are less likely to be reoriented in a straight line configuration on the surfaces of the patty when the surfaces of the patty are subjected to unidirectional frictional forces.

The apparatus of the present invention is seen to effect a novel method for forming a patty of plastic food material. In a broad sense, the method involves forming the plastic material into a plurality of self-contained plugs and assembling the plugs in a packed array to form a patty with interstitial voids between portions of adjacent plugs. Preferably, the method includes forming the plugs as generally right cylinders and assembling the plugs in a generally disc-like patty.

In one form of the method of the present invention, and as effected by the apparatus of the present invention, the plugs are formed by extrusion of material into elongate prism shapes in generally parallel alignment in a common extrusion direction. The extruding movement of the leading end of each plug is then arrested at a common plane generally perpendicular to the extruding direction and each plug is then expanded circumferentially, perpendicular to the extruding direction, to bring portions of each plug into contact with adjacent plugs while trapping air within interstitial voids or air spaces between other portions of adjacent plugs which can function as, among other things, reservoirs for the cooking juices.

Although lower block 140 of the illustrated embodiment is shown as separate from support plate 112, it is to be realized that block 140 and plate 112 could be formed as an integral or unitary piece. In that case the plug forming cavities 144 within block 140 and the transfer cavities 113 within plug 112 would merge into a single, continuous smooth-wall cavity.

It is to be realized that the size of the plug forming cavities 144 and transfer cavities 113, though preferably of the same diameter, could be of any size suitable for forming a patty comprising a plurality of plugs of material in a packed array. Similarly, the pistons 148 within those cylinders may be varied in size and the stroke length of the pistons may be varied as necessary depending upon the type of material being molded.

The pistons 148 may be made removable from the mounting block 150 for ease in changing the pistons and/or replacing broken or damaged pistons as may be necessary. The pistons 148 may also be separately actuated so that a variation in density across the diameter or width of the molded product may be achieved, if desired. The spacing between the plug forming cavities, as well as the array configuration, may be varied as desired depending upon the type of materials being molded and the desired characteristics of the molded product.

Figure 25:
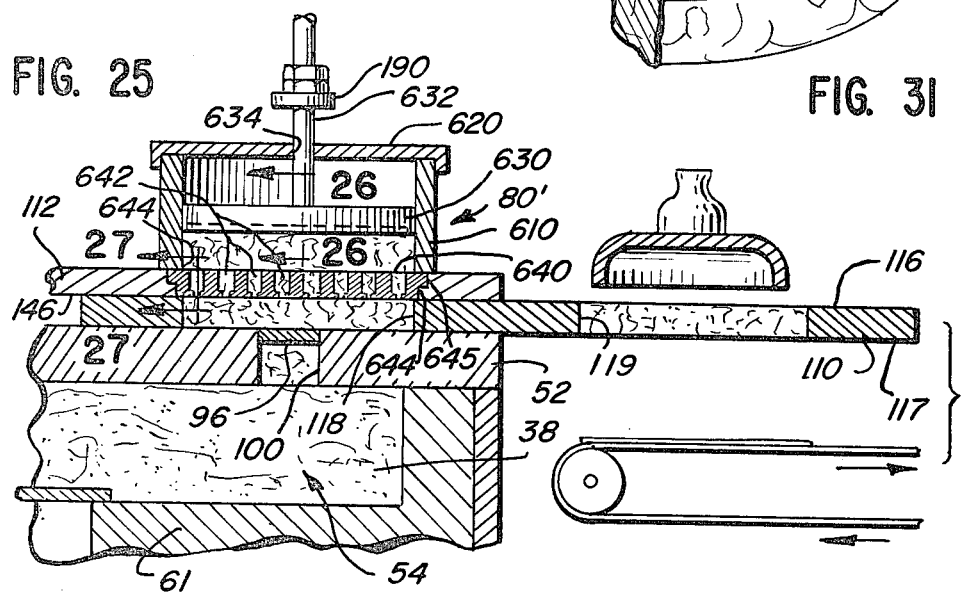
FIG. 25 is a fragmentary, cross-sectional view of a second embodiment of the apparatus of the present invention similar to FIG. 14 for the first embodiment of the present invention.

A second embodiment of the apparatus of the present invention is illustrated in FIGS. 25 through 28. FIG. 25 shows a cross section of the mold forming area of the apparatus similar to FIG. 14 for the first embodiment of the apparatus previously described. In the first embodiment illustrated in FIG. 14, the mold device 80 includes a multi-cylinder/piston assembly. In contrast, in the second embodiment, the multi-cylinder/piston assembly is replaced by a single cylinder/piston and grid assembly, or mold device 80'.

Specifically, in FIG. 25, the mold device 80' is seen to include a cylinder 610 above the mounting plate 112, a cylinder end cap 620 closing the upper end of the cylinder 610, and a piston 630 slidably disposed within the cylinder 610. The piston 630 has a piston rod 632 projecting upwardly through an aperture 634 in the end cap 620. The distal end of the rod 632 is adapted to engage the bearing member 190 on a hydraulic actuating cylinder (not illustrated, but similar to cylinder 182 for the first embodiment illustrated in FIG. 14). The piston can be forced downwardly by downward movement of bearing member 190.

A foraminous member, such as a circular grid plate 640 is disposed across the bottom circular opening of the cylinder 610 and defines an array of apertures or passages 642 therein. The mounting plate 112 may be formed with a large cylindrical bore 644 and counterbore 645 for receiving the grid plate 640. Alternatively, the mounting plate 112 could extend entirely across the bottom of the cylinder 610 and could be provided with an array of apertures identical to apertures 642 so as to eliminate the need for a separate grid plate 640.

Figure 26:
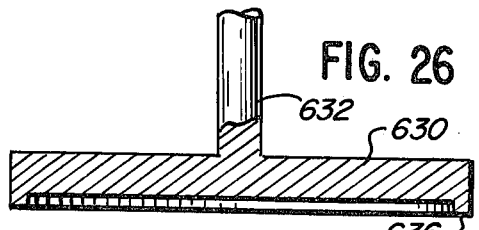
FIG. 26 is a fragmentary, cross-sectional view taken generally along the plane 26—26 in FIG. 25.

As best seen in FIG. 26, the piston 630 has a peripheral flange 636 defining a recess under the piston 630 so that some food material is retained under the piston when the piston is moved outwardly against the grid plate 640. Preferably, annular flange 636 has a depth of between ¼ inch and 5/16 inch relative to the downwardly facing major face of the piston.

The rest of the apparatus of this second embodiment is identical to that discussed above for the first embodiment illustrated in FIGS. 1 through 14.

The operation of the second embodiment of the apparatus illustrated in FIG. 25 is basically similar to that of the first embodiment discussed above. The transfer plate 110 is first positioned as shown in FIG. 25 with the transfer cavity 118 aligned below the grid plate 640.

During the feeding of the material 38 from the feed chamber 54, the material is forced through the transfer cavity 118 of the transfer plate 110, through the apertures 642 in the grid plate 640 and into the cylinder 610 beneath the piston 630. The cylinder 610 functions as a receiving means for holding a supply of the food material above the grid plate 640.

As the cylinder 610 is filled with material, the piston 630 is moved upwardly to a predetermined height. The height may be adjustably set by any suitable means, including an adjustable stop means, similar or identical to stop means 154 illustrated in FIG. 2 for the first embodiment of the apparatus.

After the cylinder 610 is filled with material, the closure member 96 is moved to close aperture 100 below the grid plate 640 and the transfer plate 110 is moved from the position shown in FIG. 25 to the left (as viewed in FIG. 25) to bring the mold opening 119 into alignment with the grid plate 640. The orientation of the transfer plate 110 would then be similar to that illustrated for the first embodiment in FIG. 10.

The piston 630 is next forced downwardly, as by a hydraulic actuator in a manner described above for the first embodiment of the apparatus, to force the food material back through the grid plate apertures 642. When the piston 630 is moved downwardly in the cylinder 610, it functions as a pressurizing discharge means for moving the material from the cylinder 610 through the apertures 642 and into the mold that is defined by the mold opening 119 of the transfer plate, by the upper surfaces of the cover plate 52 and closure member 96, and by the grid plate 640.

The material discharged into the mold forms a relatively porous patty having a relatively low density which permits penetration of air within the patty for promoting rapid and uniform cooking of the patty and which aids in retention of the cooking juices.

The foraminous member 640 may be relatively thick or may be relatively thin. If relatively thick, the apertures 642 could each have a generally cylindrical shape for thereby collectively defining an array of generally cylindrical bores similar to the plug forming cavities 144 in the multi-cylinder block 140 of the first embodiment of the apparatus described above and illustrated in FIGS. 1 through 14.

On the other hand, the foraminous member 640 may be a relatively thin grid plate so that each grid plate aperture 642, if cylindrical in shape, has a diameter greater than its height.

Figure 27:
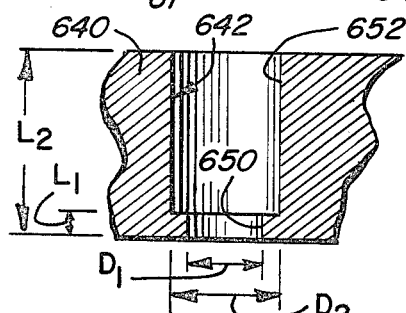
FIG. 27 is a greatly enlarged, fragmentary, cross-sectional view taken generally along the plane 27—27 in FIG. 25.

Preferably however, the grid plate 640 has an array of apertures 642 with the novel counterbore design best illustrated in FIG. 27 for one aperture 642. Specifically, each aperture in grid plate 640 comprises a cavity or passage having a first cylindrical bore 650 of diameter $D_1$ and a second cylindrical bore 652 of diameter $D_2$. The bores 650 and 652 are concentrically oriented so that their longitudinal axes are coincident.

It can be seen that the first bores 650 each have a first opening adapted to communicate with either the transfer cavity 118 or the mold opening 119 of the transfer plate 110, depending upon the position of the transfer plate during the molding cycle. Further, the second bores 652 each have a second opening communicating with the cylinder 610.

Preferably the diameter $D_1$ of the first bore 650 is substantially less than the diameter $D_2$ of the second bore 652. Further, the height $L_1$ of the first bore 650 is preferably substantially less than the thickness $L_2$ of the plate 640. As an example, the plate 640 has been fabricated and used in the apparatus of the present invention to make a patty wherein the thickness $L_2$ of the plate 640 is 5/16 inch, wherein the height $L_1$ of the first bore 650 is 1/32 inch, and wherein the diameters $D_1$ and $D_2$ of the first and second bores 650 and 652, respectively, are ⅛ inch and 3/16 inch, respectively.

Use of the grid plate 640 (with the novel counterbore construction illustrated in FIG. 27) in the apparatus of the present invention provides a patty of relatively low density which has air spaces or interstitial voids for trapping air and retaining cooking juices. This promotes a more rapid and uniform cooking of the patty. Specifically, with reference to FIG. 28, it can be seen that as the food material 38 is forced through the apertures 642 of the grid plate 640 by the piston 630, the food material is extruded as long, generally cylindrical plugs 660 which tend to curl and ultimately impinge against the top surface of the cover plate 52 or closure member 96 (which together form the bottom surface of the mold).

The long, twisting plugs 660 also tend to expand in diameter. It has been found that where the first bore 650 has a diameter $D_1$ of ⅛ inch, the formed plug expands to between about 3/16 inch and ¼ inch in diameter. The curling and twisting of each plug 660 into a curlicue configuration provides an increase in interstitial void spaces and aids in the formation of a relatively low density patty that is very porous.

It is to be noted that in the preferred form of the grid plate as illustrated in FIG. 27, the height of each first bore 650 is relatively small compared with the thickness of the plate. Thus, there is a relatively small surface area defining the cylindrical wall of each bore 650. This reduced surface area is advantageous since the boundary layer friction is reduced as the material 38 is discharged through the bore 650. That is, if the height $L_1$ of a bore 650 were much greater, say equivalent to the thickness $L_2$ of the plate 640, then the plug 660 formed in the bore 650 would be subjected to boundary layer friction forces for a much greater portion of its length. This would tend to align the tissue fibers within the food material and to form a more dense plug. By reducing the amount of cylindrical wall surface area that is in contact with the plug 660 as the plug is being formed, it is believed that the density of the plug 660 per se is reduced and that the tendency to align tissue fibers within the plug 660 is also reduced.

The novel grid plate structure of the second embodiment of the present invention is self-cleaning during operation. With reference to FIG. 24, it is possible that a single tissue fiber may enter more than one aperture or cavity during the filling of the cylinder 610 and may thus "hang up" on the bottom openings of the cavities or apertures in the grid plate 640. When the material is subsequently moved out of the cylinder 610 into the mold, any tissue fibers which were stuck on the bottom of the grid plate 640 will be forced into the mold.

Similarly, a single tissue fiber may, as it is moving out of the receiving chamber within cylindr 610 and through grid plate 640, hang up on the apertures 642 on the upper side of the grid plate 640. However, during the subsequent filling operation (wherein material is pushed upwardly through the apertures 642 of the grid plate 640 to again fill the cylinder 610), the tissue fibers that were caught on the top of the grid plate 640 will be dislodged and moved back into the cylinder 610. In this manner, the bidirectional movement of material through the grid plate 640 will dislodge fibers that have been caught on either side of the grid plate. Thus, the tendency of the grid plate to plug up with tissue fibers is substantially reduced.

Patties have been made with the second embodiment of the apparatus of the present invention. A grid plate was used in which the grid plate was 5/16 inch thick, in which each first bore had a diameter of ⅛ inch, in which each second bore had a diameter of 3/16 inch, and in which each first bore had a length, as measured along its longitudinal axis, of 1/32 inch. The 4 ounce patty of ground beef formed with such a grid plate was found to cook rapidly, in approximately 90 to 100 seconds, with very little reduction in weight. Specifically, the weight reduction in a 4 ounce patty was only about ¼ ounce during cooking.

Figure 29:
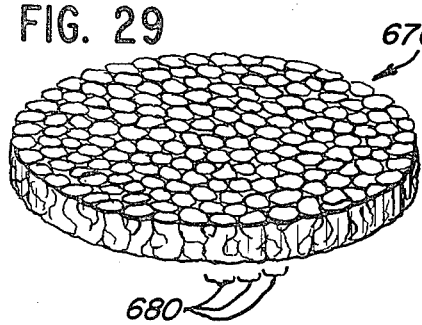
FIG. 29 is a diagrammatic, perspective illustration of a type of patty formed in accordance with the method of the present invention.
Figure 30:
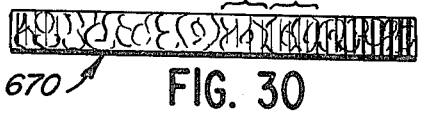
FIG. 30 is a diagrammatic, elevational view of the patty illustrated in FIG. 29.

A patty formed by the second embodiment of the apparatus of the present invention is illustrated in FIGS. 29 and 30. The patty 670 is seen to comprise a plurality of curled and twisted, elongate plugs 660. Each of the plugs 660 is curled and twisted in a prismatic volume 680, approximately cylindrical in shape. Each of these prismatic volumes 680 contains one curled and twisted plug 660. Each plug is so twisted and curled that the prismatic volume 680 has a relatively large number of interstitial void spaces for entrapping air and which define reservoirs for retaining the cooking juices. In addition, void spaces are also necessarily defined between the boundaries of the adjacent prismatic volumes 680 for similarly entrapping aid and forming reservoirs which retain cooking juices.

Figure 31:
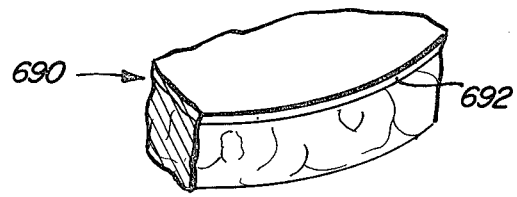
FIG. 31 is a fragmentary, diagrammatic, perspective illustration of another type of patty formed in accordance with the method of the present invention.

FIG. 31 illustrates a modification of the patty of plastic food material of the present invention wherein a portion of a patty 690 is diagrammatically illustrated in perspective. A major portion of patty 690 is identical to the patty 670 previously described and illustrated in FIGS. 29 and 30. However, the modified patty 690 has an additional structural feature which includes a layer 692 of somewhat dense food material on the top surface of the patty.

Specifically, the layer of plastic food material 692 is relatively dense compared to the underlying portion of the patty. The layer 692 is also relatively thin compared to the thickness of the patty 690 and extends completely over the top of the patty 690, thereby closing off most of the interstitial void spaces below the shear layer 692. The layer 692 is pressed against the tops of the many separate quantities or food volumes 680 so that it is attached to the underlying patty structure.

A patty 690 can be formed with the layer 692 by the first or second embodiments of the apparatus of the present invention by providing a certain amount of clearance between the top surface 116 of the mold transfer plate 110 and the facing bottom surface 146 of the mounting plate 112. With reference to FIG. 25, if the clearance between the transfer plate 110 and mounting plate 112 is between about 0.01 and about 0.012 inch, the plastic food material trapped within this clearance region in the mold area will be subject to frictional forces when the transfer plate 110 is moved from the patty molding position to the patty ejecting position. As the transfer plate 110 is so moved, the plastic food material in the clearance region is forced against the top surface of the formed patty by the undersurface 146 of the superposed mounting plate 112.

Depending upon the specific clearance in the apparatus, the resulting "shear-formed" layer of plastic food material on the top of the patty is preferably about 1/64 of an inch thick. In a hamburger patty of typical commercial size, the shear layer thickness would be a relatively small fraction of the thickness of the whole patty—between ⅛ and 1/128 inch. Of course, greater or lesser shear layer thicknesses can be achieved by providing greater or lesser clearances in the apparatus.

It is preferable to provide a layer 692 that is thick enough to aid in holding the patty 690 together and to reduce the tendency of the patty to break apart during handling prior to, during, and after cooking.

It is believed that the layer 692 also functions to trap the air and vapors in the interstitial voids below the layer during cooking to thereby promote more rapid and more uniform cooking of the patty and to thereby aid in retention of the cooking juices.

The layer 692 can be formed more positively by providing a grid plate, such as grid plate 640 in FIG. 25, in which the bottom of the grid plate facing the mold opening is recessed upwardly a slight amount compared to the bottom surface 146 of the mounting plate 112 in which the grid plate is mounted. This will positively insure that a sufficient amount of plastic food material is deposited on the top portion of the formed patty to form the shear layer 692 when the transfer plate is moved from the patty molding position to the patty discharge position. Alternatively, an annular spacer ring could be secured to the mounting plate bottom surface 146 concentric with, and outwardly of the grid plate 640 to receive the additional food material for forming the shear layer.

The patty 690 formed with the layer 692 is intended to be cooked on a grill or other heating surface with the layer 692 on the top of the patty so as to effectively trap the vapors and juices within the patty during cooking. With some types of cooking processes and with some types of food material, it may prove desirable to also provide a shear layer, similar to shear layer 692, on the bottom of the patty. This could be readily accomplished with the apparatus of the present invention by providing sufficient clearance between the transfer plate 110 bottom surface 117, and the top of the support plate 52 and/or by providing a slight convex recess within the mold region in the support plate 52.

Of course, it is to be realized that the layer 692 can be formed on a patty with both the second embodiment of the apparatus illustrated in FIG. 25 and with the first embodiment of the apparatus illustrated in FIGS. 1 through 14. In the case of the first embodiment of the apparatus of the present invention, a shallow, upwardly convex, recess could be provided in the mounting plate 112 below the multi-cylinder block 140. The resulting shear layer would cover the top of the patty (illustrated in FIGS. 17 and 18 as formed from an array of closely packed plugs).

In certain processes, and/or with certain plastic food materials with which a shear layer may not be desirable, adjustment or construction of the apparatus to reduce the clearances (i.e., between the transfer plate 110 and the lower support plate 52 and upper mounting plate 112) will eliminate the regions in which excess plastic food material can collect. This will have the effect of producing a "knife-like" cutoff of the food material on both sides of the transfer plate. With such reduced clearances, the shear layer would not be formed at all, or would be formed so very thin that it would not be able to function to hold the patty together or retain cooking vapors.

Figure 28:
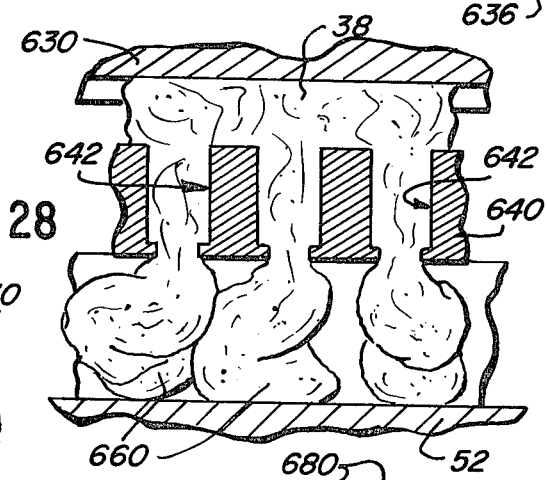
FIG. 28 is a greatly enlarged, fragmentary, cross-sectional view similar to FIG. 27 but diagrammatically illustrating the discharge of food material during molding of a patty.
Figure 32:
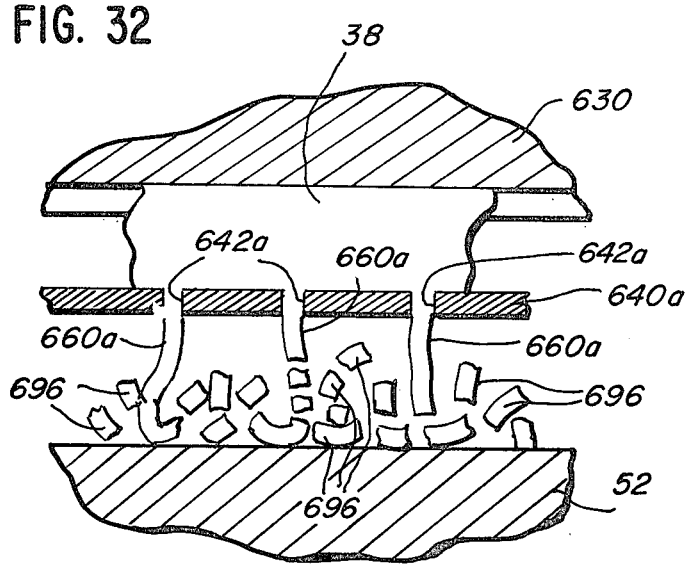
FIG. 32 is a greatly enlarged, diagrammatic view of a modification of the second embodiment of the apparatus of the present invention, similar to FIG. 28, and diagrammatically illustrating the discharge of food material during molding of a patty.

A modification of the second embodiment of the apparatus illustrated in FIGS. 25 through 28 is illustrated in FIG. 32 which shows a cross section of the mold forming area of the apparatus similar to the area shown in FIG. 28 and previously described.

In this modification however, a thin grid plate 640a is provided between the piston 630 and the mold cavity defined above the top surface of cover plate 52. The plate 640a has an array of passages, apertures, or orifices, such as generally right cylindrical bores 642a. Preferably, the bores 642a are relatively small, about ⅛ inch in diameter, and are spaced relatively far apart in the grid plate 640a—the spacing between the center lines of the adjacent bores 642a being greater than the bore diameter.

Figure 33:
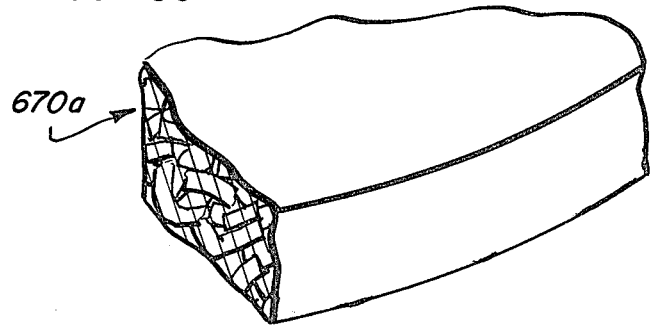
FIG. 33 is an enlarged, fragmentary, diagrammatic, perspective illustration of the type of patty formed in accordance with the apparatus and method illustrated in FIG. 32.

It can be seen that as food material 38 is forced through the bores 642a of the grid plate 640a by the piston 630, the food material 38 is formed into long strings 660a and, owing to the relatively small diameter of the bores, the material strings 660a move through the aperture bores and into the mold opening at a relatively high rate of speed. The material 38 fills the mold to form a patty, such as the patty 670a illustrated in FIG. 33, which has a relatively low density and which may be characterized as having a "fluffy" quality. Such a patty has been found to cook uniformly and very rapidly.

The exact mechanism by which the material strings 660a are formed into the relatively low density patty is not completely understood at this time and there is no intent herein to be bound by any theory or any explanation. However, with some types of food, and within certain process temperature ranges, it appears that relatively small diameter strings 660a are ejected at such a high rate of speed into the mold that the strings 660a break apart, either before or after impinging upon the surface of plate 52, to form many small fragments 696 with a vast number of interstitial air spaces between the fragments 696. The relatively large spacing between bores 642a apparently aids in creating the large number of interstitial air spaces between the food material fragments 696 so that the formed patty has a relatively low density and fluffy characteristics. With other types of food material, and depending on the temperature range, the thin strings may not necessarily break into fragments. However, the strings do form curliques of material defining the desired interstitial void spaces.

It is to be understood that the patty 670a formed according to the above-described modification of the method illustrated in FIG. 32 could also be molded with a "shear-formed" layer on the top and/or bottom of the patty as is illustrated for layer 692 on the patty 690 in FIG. 31. The techniques and mechanisms for forming such a layer 692 would be substantially the same as those previously described with respect to the layer 692 on patty 690.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. A method for forming a patty of plastic food material, including ground meat and the like, which is subject to shrinkage during cooking, said method comprising the steps of:
   (a) forming said material into a plurality of plugs having generally oppositely extending ends; and
   (b) assembling said plugs into a closely packed array to define a patty without substantially inwardly compressing each plug laterally and providing a substantially continuous layer of material disposed across and connecting the ends of said plugs on one of the surfaces of said formed patty to aid in holding the patty together and, when the patty is cooked on a grill with the layer at the top of the patty, to aid in retaining vapors and juices within the patty to thereby promote more rapid cooking.

2. The method in accordance with claim 1 in which step (a) includes forming said material into a plurality of generally right cylinders.

3. A method for forming a patty of plastic food material, such as ground meat and the like, which is subject to shrinkage during cooking and which contains elongated tissue fibers, said method comprising:
   (a) feeding a quantity of said material under a predetermined feed pressure into a plurality of elongate pressurizable cavities through open ends in each said cavity;
   (b) terminating said feeding of said material;
   (c) disposing an impingement plate adjacent and spaced from said open ends of said cavities;
   (d) discharging said food material from said cavities through said cavity open ends in a generally common discharge direction to form plugs having general transverse leading end surfaces with said tissue fibers generally randomly distributed within the plugs and with said leading end surfaces of said plugs impinging against said plate to cause at least a leading segment of at least one of said plugs to expand circumferentially and contact lateral surface portions of adjacent plugs to form the patty; and
   (e) retaining interstitial voids between other portions of adjacent plugs for enclosing air and defining reservoirs for the cooking juices.

4. The method in accordance with claim 3 in which said impingement plate defines a continuous solid impingement surface and in which step (d) includes causing the leading ends of said plugs to impinge against said impingement surface.

5. A method for making a patty of plastic food material, including ground meat and the like, which is subject to shrinkage during cooking and contains elongated tissue fibers, said method comprising:

(a) providing a supply of said plastic food material;

(b) providing a plurality of pressure cavities with each cavity having at least one opening at one end and with a pressure transmitting means spaced from said opening and moving a quantity of said food material from said supply of food material under pressure through the cavity openings into said cavities and against said pressure transmitting means; and (c) applying pressure in said cavities with said pressure transmitting means to discharge a portion of the food material therefrom out of said cavity openings in discrete extrudate masses into a mold to form a patty.

6. A method for forming a patty of plastic food material, such as ground meat and the like, which is subject to shrinkage during cooking and which contains tissue fibers, said method comprising:

(a) providing a supply of plastic food material;

(b) providing (1) a feed chamber adjacent said supply of food material with a feed aperture in said feed chamber and a closure member movable for opening and closing said aperture, (2) a transfer plate adjacent said feed chamber movable relative to said aperture in said feed chamber and defining a transfer cavity and a mold cavity, and (3) a plurality of pressurizing cylinders having pistons slidably disposed therein, said cylinders being aligned with said feed aperture;

(c) closing said aperture with said closure member while feeding a quantity of said material under pressure from said supply along said feed chamber;

(d) moving said transfer plate to align said transfer cavity with said feed aperture and said pressurizing cylinders and then moving said closure member to open said aperture to allow said pressurized material to flow through said transfer cavity and into said pressurizing cylinders;

(e) terminating the feeding of said material;

(f) moving said closure member to close said aperture;

(g) moving said transfer plate to align said mold cavity with said feed aperture and said pressurizing cylinders;

(h) moving said pistons within said pressurizing cylinders to force said material from said pressurizing cylinders into said mold cavity to form said patty as an array of plugs of material with each plug having exterior surface portions in contact with adjacent plugs while retaining interstitial voids between other portions of adjacent plugs; and (i) moving said transfer plate to a discharge station and ejecting the patty from said mold cavity.

7. A method for forming a patty of plastic food material, said material including ground meat and the like, which contains tissue fibers, said method comprising the steps of:

(a) providing mold parts defining a mold cavity having the shape of said patty;

(b) providing a foraminous member defining apertures therein adjacent said mold cavity;

(c) forcing said food material from one side of said foraminous member under pressure through said apertures to the other side of said foraminous member and into said mold cavity to thereby extrude a plurality of elongate plugs of said material in generally parallel alignment in a common extruding direction with each plug having a leading end;

(d) arresting the extruding movement of the leading end of each plug at a substantially common plane;

(e) while continuing to effect step (d), expanding said plugs in directions generally perpendicular to the extruding direction to bring portions of the exterior surfaces of adjacent plugs into contact to form a patty; and (f) penetrating said foraminous member apertures with means for dislodging tissue fibers lodged on the upstream side of said member.

8. The method in accordance with claim 7 in which step (f) includes penetrating said foraminous member apertures with some of said food material.

9. A method for forming a patty of plastic food material containing tissue fibers, said material including ground meat and the like, said method comprising the repeatable sequence of:

(a) providing at least one mold part defining a mold cavity and a member defining a plurality of openings therein adjacent the mold cavity;

(b) moving said material in a first direction at least into said openings; and (c) moving at least a portion of said material in a second, opposite direction out of said openings into the mold cavity to form said patty whereby tissue fibers are dislodged from said member by the movement of said material in said second direction.

10. A method for forming a patty of plastic food material containing tissue fibers, said material including ground meat and the like, said method comprising the repeatable sequence of:

(a) providing a mold and a member defining a plurality of passages therein adjacent the mold;

(b) moving said material in a first direction at least into said passages;

(c) moving at least a portion of said material from said passages in a second, opposite direction out of said passages into the mold to form said patty whereby the tissue fibers are dislodged from said passages by the movement of said material in said second direction; and (d) forcing some of said food material from said formed patty over the top of said formed patty to provide a layer of relatively dense food material to aid in holding the patty together and, when said patty is cooked on a grill with said layer at the top of the patty, to aid in retaining vapors and juices within the patty to thereby promote more rapid cooking.

11. A method for forming a patty of plastic food material containing tissue fibers, said material including ground meat and the like, said method comprising the repeatable sequences of:

(a) providing a mold and a member defining a plurality of passages therein adjacent the mold, said passages extending through said member and each defining first and second openings on opposite sides of said member;

(b) moving said material in a first direction into said passages through said passage first openings and out of said passages through said passage second openings to dislodge tissue fibers from said passage second openings; and (c) moving a quantity of said material in a second, opposite direction back into said passages through said passage second openings and out of said passages into the mold to form said patty whereby tissue fibers are dislodged from said passage first openings by the movement of said material in said second direction.

12. A method for forming a patty of plastic food material containing tissue fibers, said material including ground meat and the like, said method comprising the repeatable sequence of:
   (a) providing a mold and a member defining a plurality of passages therein adjacent the mold;
   (b) moving said material in a first direction into said passages and through said passages into a receiving chamber with some of said material remaining in said passages; and
   (c) moving at least a portion of said material from said receiving chamber in a second, opposite direction back into said passages to discharge said material as a plurality of elongate, curling plugs into the mold to form a patty with interstitial voids whereby tissue fibers are periodically dislodged from said passages by the movement of said material in said first and second directions.

13. A method for forming a patty of plastic food material, including ground meat and the like, which contains tissue fibers, said method comprising the steps of:
   (a) providing parts defining a mold cavity having the shape of said patty;
   (b) providing a foraminous member defining apertures therein adjacent said mold cavity;
   (c) forcing said food material from one side of said foraminous member under pressure through said apertures to the other side of said foraminous member and into said mold cavity as discrete extrudate masses with each mass having at least a leading end segment;
   (d) continuing to force said food material into said mold cavity to form a patty with the leading end segments of at least some of said masses impinging against a region of said mold cavity parts and buckling to bring buckled mass portions into overlapping relationship; and
   (e) penetrating said foraminous member apertures from said other side of said foraminous member with aperture entering means for dislodging tissue fibers lodged on the upstream side of said member.

14. The method in accordane with claim 13 in which step (d) also includes breaking at least a portion of some of said discrete means into fragments.

15. The method in accordance with claim 13 in which step (e) includes penetrating said foraminous apertures with some of said food materil.

* * * * *

UNITED STATES PATENT OFFICE
CERTIFICATE OF CORRECTION

Patent No. 4,272,864                  Dated June 16, 1981

Inventor(s) Harry H. Holly

It is certified that error appears in the above-identified patent and that said Letters Patent are hereby corrected as shown below:

```
Column 7, line 31, "on" should be --or--.
Column 9, line 48, "hydralic" should be --hydraulic--.
Column 16, line 58, "upwardly through" should be
  --upwardly and through--.
Column 19, line 12, "cylindr" should be --cylinder--.
Column 19, line 51, "aid" should be --air--.
Column 26, line 21, "accordane" should be --accordance--.
Column 26, line 23, "means" should be --masses--.
Column 26, line 26, "materil" should be --material--.
```

Signed and Sealed this

Twenty-fourth Day of August 1982

[SEAL]

Attest:

GERALD J. MOSSINGHOFF

Attesting Officer      Commissioner of Patents and Trademarks